US008620790B2

(12) United States Patent
Priebatsch (10) Patent No.: US 8,620,790 B2
(45) Date of Patent: Dec. 31, 2013

(54) SYSTEMS AND METHODS FOR DYNAMIC TRANSACTION-PAYMENT ROUTING

(71) Applicant: Seth Priebatsch, Boston, MA (US)

(72) Inventor: Seth Priebatsch, Boston, MA (US)

(73) Assignee: SCVNGR, Boston, MA (US)

( * ) Notice: Subject to any disclaimer, the term of this patent is extended or adjusted under 35 U.S.C. 154(b) by 0 days.

(21) Appl. No.: 13/939,676

(22) Filed: Jul. 11, 2013

(65) Prior Publication Data

US 2013/0311375 A1   Nov. 21, 2013

(51) Int. Cl.
*G06Q 40/00* (2012.01)

(52) U.S. Cl.
USPC .............................. 705/35; 705/44

(58) Field of Classification Search
USPC ..................................... 705/35–44
See application file for complete search history.

(56) References Cited

U.S. PATENT DOCUMENTS

| 7,941,369 | B2 | 5/2011 | Juras et al. | |
| 8,364,544 | B2 | 1/2013 | McAlhaney | |
| 2002/0095303 | A1 | 7/2002 | Asayama et al. | |
| 2004/0024707 | A1 | 2/2004 | Perre et al. | |
| 2013/0144792 | A1* | 6/2013 | Nilsson et al. | 705/67 |
| 2013/0173475 | A1* | 7/2013 | Lund | 705/67 |
| 2013/0268381 | A1* | 10/2013 | Randazza et al. | 705/21 |

FOREIGN PATENT DOCUMENTS

WO   WO-2010141239 A1   12/2010

* cited by examiner

*Primary Examiner* — Thu Thao Havan
(74) *Attorney, Agent, or Firm* — Bingham McCutchen LLP (57) ABSTRACT

A mobile payment transaction aggregator designed to identify, on a per transaction basis, a payment processor from a plurality of available payment processors with the lowest processing fee for the given transaction. Additionally, the aggregator may bundle multiple payment transactions of a single consumer across multiple merchants for additional savings.

22 Claims, 4 Drawing Sheets

SYSTEMS AND METHODS FOR DYNAMIC TRANSACTION-PAYMENT ROUTING

TECHNICAL FIELD

The present invention relates, in general, to payments made with mobile devices and, in particular, to dynamically selecting a payment processor.

BACKGROUND

It is common practice for consumers to pay a merchant electronically for goods or services received. Electronic payments are typically made with a token that identifies a source of funding. For example, a credit card containing a magnetic strip is a token. Payment tokens usually contain static information, such as an account number, identifying a source of payment. When a credit card is swiped, the card number is transmitted to a centralized payment-processing system. Before authorizing payment, the centralized payment-processing system may verify whether the account exists and is active, whether the account can fund the transaction, and/or whether the transaction may be fraudulent.

The merchant may pay two separate entities in the course of processing a credit card or debit card transaction. It pays an interchange fee to the bank that issued the consumer's card (the issuing bank) and an assessment fee to the card brand (e.g., VISA). Most merchants are not equipped to handle the data security required to process the transactions themselves and instead use the services of a third-party payment processor to move the transaction through the card network. While interchange and assessment fees are fixed regardless of which processor a merchant uses, the fee added by a payment processor ("markup costs") can vary greatly from one payment processor to the next. Factors affecting these differences include not only variations in overall rates but also pricing differences based on the card used by the consumer, the type of transaction, overall transaction volume, even the date and time. These variations make it difficult for a merchant to select the processor that will assess the lowest fees possible for a particular transaction. One processor may charge a low markup cost for one type of transaction (e.g., debit card usage) but a high markup cost for another type of transaction (e.g., a transaction under $100) while another processor's pricing plan is the opposite. Unfortunately, a single merchant does not usually have a high enough credit/debit card transactional volume to enter into a contract with more than one processor, and must therefore accept the pricing model imposed by a single payment processor.

Accordingly, there is a need for systems and methods that allow a merchant, or third party acting on the merchant's behalf, to identify and select the cost-optimal payment processor on a per transaction basis.

SUMMARY

The present invention utilizes the increasing popularity of mobile payment transactions in which an aggregator processes payment transactions for individual consumers across a range of merchants, resulting in a credit/debit card transactional volume high enough to allow the aggregator to contract with a plurality of payment processors (with different pricing models). This, in turn, allows the aggregator to dynamically select the optimal processor for each transaction. Additionally, the aggregator may bundle multiple payment transactions of a single consumer across multiple merchants for additional savings. Systems that facilitate mobile payments typically allow the user to present a mobile device at the point of sale (POS); the mobile device displays a payment token (usually in the form of a barcode or QR code) generated by the transaction aggregator and accepted by the merchant as a guarantee of payment. As used herein, the term "merchant" broadly connotes any seller of goods and/or services, often, but not necessarily, at a POS location.

Accordingly, in one aspect, the invention pertains to a computer-implemented method of conducting a payment transaction between a merchant and a consumer. In representative embodiments, the method includes receiving and storing payment-processing fee rates from a plurality of payment processors available to process the transaction; the fee rates are classified by at least one transaction attribute. The method further includes receiving, by a payment server from a merchant system, a payment-transaction authorization request for a purchase by the consumer; determining, based on computational analysis of the authorization request, at least one transaction attribute for the payment transaction; identifying, from the plurality of payment processors, a payment processor with the lowest fee based at least in part on the determined transaction attribute(s); and transmitting the authorization request to the identified payment processor to complete the payment transaction. The authorization request may comprise a payment token, a transaction amount, and a merchant identifier. Additionally, the payment token may be encoded with data identifying a financial account. In various embodiments, the transaction attribute(s) comprise a type of payment card presented by the consumer, a merchant type, a purchase type, a time of transmission of the authorization request, or an aggregate value of unprocessed transactions of a consumer involving a single financial institution.

In various embodiments, the method may additionally include, prior to transmitting the authorization request to the identified payment processor, computationally determining a transaction bundling savings for each of the plurality of processors based on the transaction attribute(s). If the determined savings is above a predetermined amount, processing of the authorization request is suspended until the earlier of (i) expiration of a predetermined delay period or (ii) receipt of additional authorization requests that when bundled qualify for the determined savings. Additionally, the method may include determining a financial risk level for the consumer by analyzing a stored transaction history and suspending processing only if the risk level is determined to be acceptable. In various embodiments, the method may include analyzing the processing fees charged by the identified payment processor upon transaction completion and updating the stored fee rates for the identified processor based on the charged fees.

In another aspect, the invention relates to a system for conducting a payment transaction between a merchant and a consumer. In various embodiments, the system includes a fee database for storing payment-processing fee rates from a plurality of payment processors available to process the transaction; the fee rates are classified by at least one transaction attribute. The system further includes a processor for executing a transaction classification module for (i) receiving, from a merchant system, a payment transaction authorization request and (ii) computationally analyzing the authorization request to determine at least one payment attribute for the payment transaction. In these embodiments, the processor further executes an identification module for identifying, from the plurality of payment processors, the payment processor with a lowest fee based on the determined transaction attribute(s), and a communication module for causing transmission of the authorization request to the identified payment processor to complete the payment transaction. The authorization request may comprise a payment token, a transaction amount, and a merchant identifier. Additionally, the payment token may be encoded with data identifying a financial account. In various embodiments, the transaction attribute(s) comprises a type of payment card presented by the consumer, a merchant type, a purchase type, a time of transmission of the authorization request, or an aggregate value of unprocessed transactions of a consumer involving a single financial institution.

In various embodiments, the system may additionally include a transaction database for storing records of suspended and completed transactions, and a bundling module for (i) computationally determining a transaction bundling savings for each of the plurality of processors based on the at least one transaction attribute and (ii) if the determined savings is above a predetermined amount, suspending processing of the authorization request and storing the suspended transaction in the transaction database. Additionally, the bundling module may be configured to maintain suspension of the transaction until the earlier of (i) expiration of a predetermined delay period or (ii) receipt of authorization requests that when bundled qualify for the determined savings. In addition, or alternatively, the bundling module may be configured to determine a financial risk level for the consumer by analyzing a stored transaction history and to suspend processing only if the risk level is determined to be acceptable.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "consumer equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a consumer of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
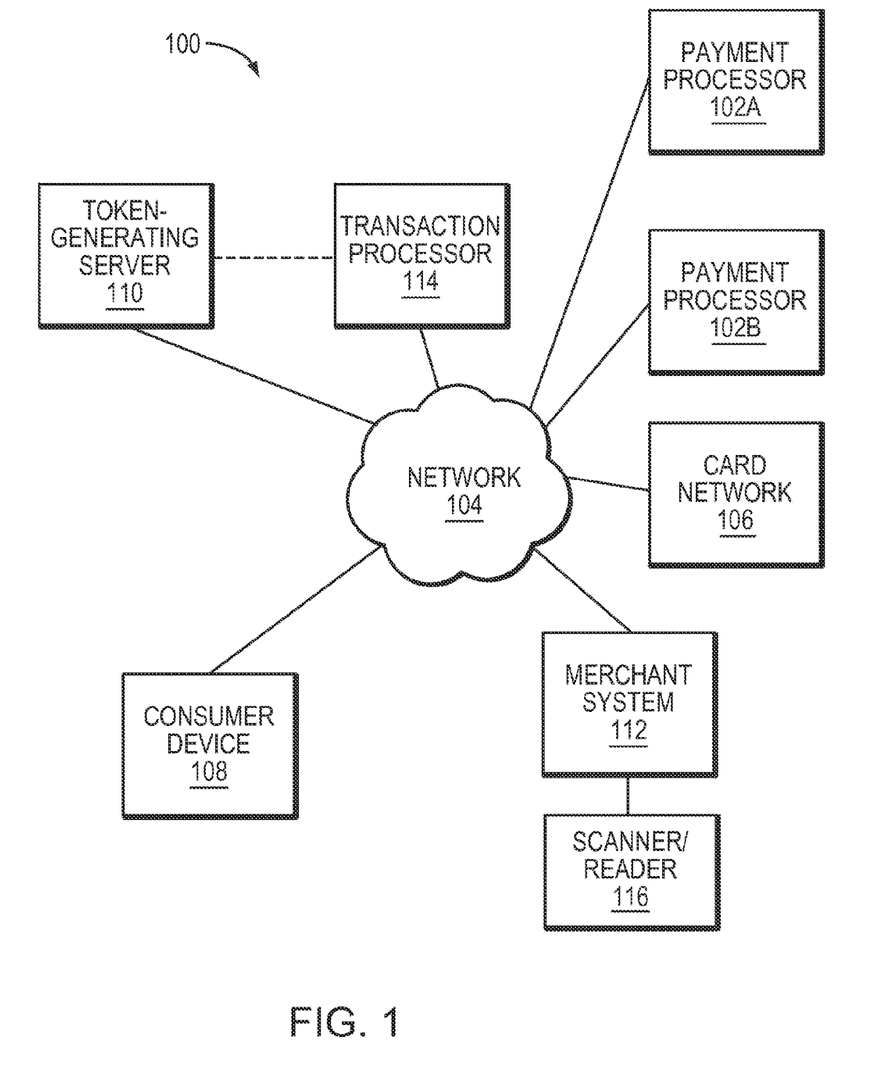
FIG. 1 is a block diagram of an exemplary network in accordance with an embodiment of the invention.

Refer first to FIG. 1, which depicts an exemplary mobile payment transaction network 100 including a plurality of payment processors 102 linked to a network 104 (e.g., a cellular telephone network, the Internet, or any wide-area network or combination of networks capable of providing point-to-point data transfer and communication) that supports wired, wireless, or any two-way communication. Each payment processor 102 may be an independent processor, an acquiring bank, an independent sales organization, or any one, or combination of, network-based agents that act as a gateway for moving transactions through a card network 106; the network 106 supports authorization, and subsequent transfer of funds, from an issuing bank to an acquiring bank. As used herein, the term "card network" generally refers to a combination of at least one issuing bank, at least one card association, and at least one acquiring bank. The network 104 connects various devices, including a consumer device (e.g. mobile device) 108, a token-generating server 110, one or more merchants systems 112, and a transaction processor 114 utilizing, again, wired, wireless, or any two-way communications. As used herein, the term "mobile device" refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs).

The token-generating server 110 is responsible for generating unique payment tokens associated with the consumer; the tokens typically contain, for example, consumer-identifying information and financial account information that the merchant may rely upon as a guarantee of payment. In response to requests made by a registered user via the consumer device 108, the server 110 generates payment tokens and transmits them to the consumer device 108 for storage and subsequent presentation to complete a payment transaction with the merchant system 112. Additionally, the token-generating server 110 maintains records of registered merchants and consumers and makes this information available to the transaction processor 114.

Each merchant system 112 may be associated with a merchant who offers goods or services for sale to, among others, the consumer possessing the mobile device 108. In one embodiment, the merchant system 112 is a POS system (e.g., an electronic cash register) that connects to a code reader or scanner (hereafter "reader") 116. The reader 116 may be capable of reading and/or decoding a payment token presented as, for example, a barcode, a radiofrequency identification (RFID) code, or a "Quick Response" (QR) code, and/or receiving signals, such as NFC signals, audio signals, or infrared signals. In addition, the reader 116 may be mobile or physically associated with the merchant system 112. The merchant system 112 transmits a payment token and transaction details to the transaction processor 114 to request authorization for a payment transaction.

In response to an authorization request from the merchant system 112 for a mobile payment transaction, the transaction processor 114 analyzes (or communicates with the manager of) the financial account linked to the token, the transaction details (transaction amount, transaction date/time, merchant type, etc.) and the transaction-processing fees of at least two payment processors 102 to identify the processor with the lowest fee for the current transaction. The transaction processor 114 may transmit an authorization request for the single transaction to the identified payment processor 102 to complete the payment transaction; the request propagates through the credit/debit card network 106 for authorization and subsequent transfer of funds from the issuing bank to an acquiring bank. Alternatively, the transaction processor 114 may evaluate the current transaction and determine that savings on processing fees may be achieved by delaying the processing of the current transaction so that it may be "bundled" with other transactions from the same consumer. This bundle is transmitted as a single request for payment from a single financial institution and represents the aggregate of multiple transactions of one consumer.

Figure 2:
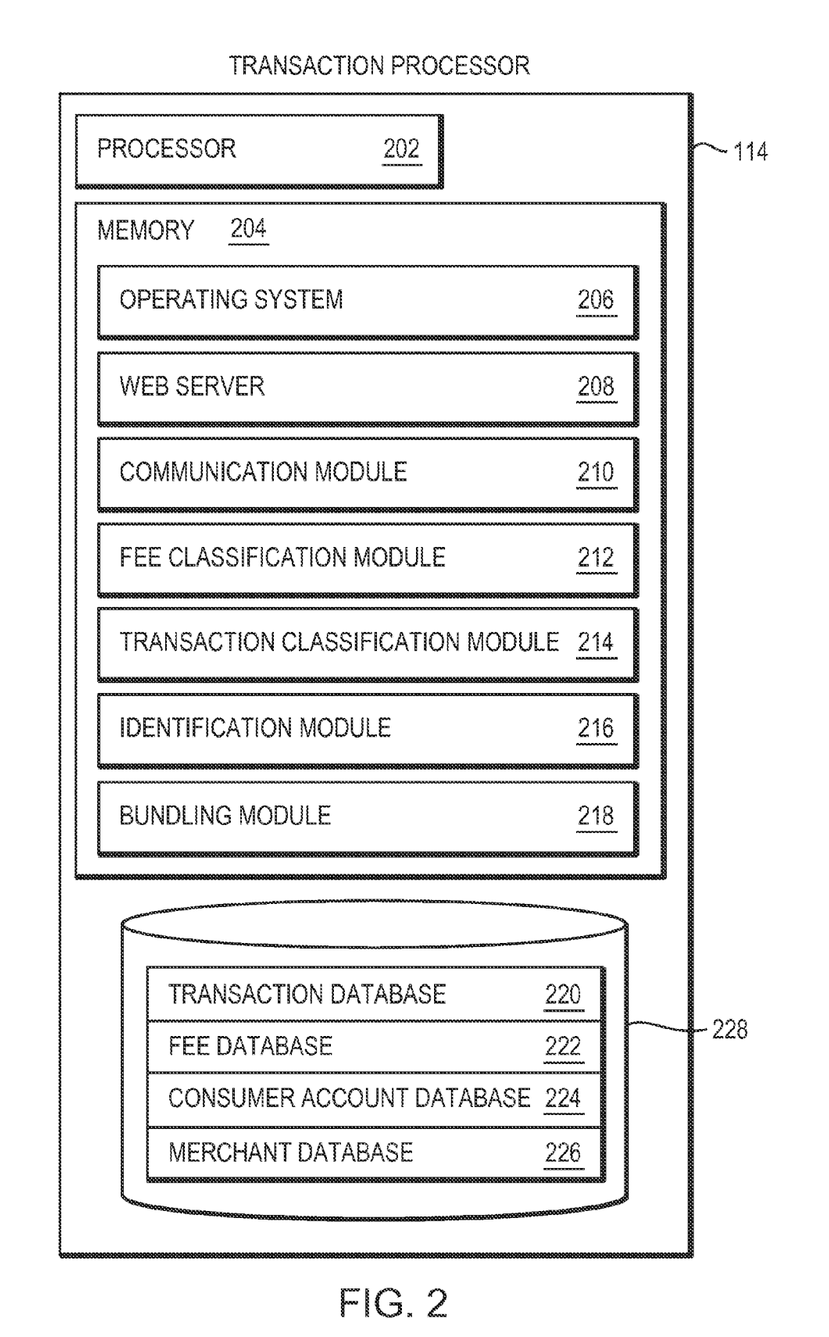
FIG. 2 is a block diagram of an exemplary transaction processor in accordance with an embodiment of the invention.

FIG. 2 illustrates in greater detail the components of a representative transaction processor 114, which may be operated by a transaction aggregator. The transaction aggregator may serve numerous merchants, aggregating a consumer's transactions across merchants and sharing with them the benefits of higher transaction volume than any single merchant could generate. The depicted system includes a processor 202 and a memory 204, which may include volatile and non-volatile portions. The memory 204 contains instructions, conceptually illustrated as a group of modules, that control the operation of the processor 202 and its interaction with hardware components. An operating system 206 directs the execution of low-level, basic system functions such as memory allocation, file management, and operation of mass storage devices. At a higher level, a web server block 208, a communication module 210, a fee classification module 212, a transaction classification module 214, an identification module 216, and a bundling module 218 perform the basic system functions described in greater detail below. The communication module 210 may be a conventional component (e.g., a network interface or transceiver) designed to provide communication with a network, such as the Internet and/or any other land-based or wireless telecommunications network or system, and, through the network, with the token-generating server 110, the merchant system 112, and the payment processors 102. The communication module 210 may be capable of communicating via different communication channels, e.g., a computer network or the Internet for some purposes and the public telecommunications infrastructure for other purposes. The web-server block 208 enables web-based communication, and can be a conventional web-server application executed by the processor 222.

A transaction database 220, a fee database 222, a consumer account database 224, and a merchant database 226 may reside in a storage device 228 and/or an external mass-storage device accessible to the transaction processor 114. Records of all suspended and completed payment transactions are stored in a transaction database 220; each record is created by the transaction classification module 214 upon analysis of an authorization request and contains, for example, transaction attributes such a financial account type, merchant type, a transaction type, a transaction amount, and, in various embodiments, a payment processor identifier of the processor selected to process the transaction. Records of the agreed-upon payment-processing fees with each payment processor 102 are saved in the fee database 208 by the fee classification module 212. Each record contains a set fee and percentage fee associated with each available payment processor 102, and the fee variations defined for every known permutation of transaction attributes available. Both the transaction database 220 and the fee database 222 are responsive to queries from to the identification module 216 and the bundling module 218. The consumer account database 224 stores, for example, a record associated with each registered consumer (or payment token) and containing (or pointing to) the relevant financial account information—e.g., a credit card number. The merchant database 226 stores, for example, a record associated with each merchant customer of the transaction aggregator; each record identifies the merchant and may classify the merchant by type. The consumer account database 224 and the merchant database are updated upon a communication, via the communication module 210, from the token-generating processor 110 and are responsive to queries from the transaction classification module 214.

In operation, the transaction aggregator enters into contracts with a plurality of payment processors 102 for agreed upon-payment-processing rates. Each new contract adds a new payment processor to the plurality of payment processors 102 available to transaction server 114, and results in new entries in the fee database 222. The agreed-upon pricing model contained in the contract may be uploaded manually for analysis to the transaction processor 114 or it may be communicated over network 104 from the payment processor and received by communication module 210 of the transaction processor 114. Upon receipt of the pricing model, the fee classification module 212 analyzes the contracted rates and extracts the relevant relationships between transaction attributes and resulting fees per transaction, typically a set fee and a percentage fee. The fee classification module 212 generates and saves a record of all possible transaction attribute permutations along with the associated fees and payment processor identifier in the fee database 222. The transaction attributes may involve the identity of a card's issuer (e.g., MASTERCARD), an account type (e.g., debit, credit, or rewards), a transaction amount (e.g., greater than $100), a type of purchase (e.g., food or clothing), a merchant type (e.g., food service or retail), a merchant size (e.g., mid-revenue tier), or any one, or combination of, attributes referenced in a processing rate contract. In various embodiments, as some pricing models (e.g., tiered pricing models) offered by payment processors do not define many of the transaction attributes that may affect the processing fee, the fee classification module 212 may update the records in the fee database 222 as more information becomes available through analysis of fees charged for specific transactions. The fee classification module 212 may analyze the completed transaction records in transaction database 220 to obtain the fees charged for a transaction completed by a payment process 102; using known attributes of the transaction, the module 212 determines or infers their relationships to the fees charge based on, for example, comparisons to other transactions involving the payment processor, and fills in theretofore unknown rates for that processor in the fee database 222. In addition, the fee classification module 212 may have access to transaction attributes for interchange fees that may be used to determine pricing for a payment processor offering an "interchange plus" model. In this pricing model, the processor simply charges a set percentage above the interchange fee for all transactions.

Payment processing is initiated when the transaction processor 114 receives a request, via the communication module 210, from a merchant system 112 to authorize a payment transaction initiated by the consumer possessing the mobile device 108. The request contains a payment token along with information about the transaction (the amount to be paid, in particular) and the merchant's own identity. Upon receipt of the authorization request, the transaction classification module 214 creates a new record in the transaction database 220 and parses the data received from the merchant system's transmission to extract fee-determining transaction attributes. Additionally, the transaction classification module 214 may query the consumer account database 224 to obtain the financial account information referenced in the payment token and query the merchant database 226 to obtain the merchant type (e.g., the merchant's type of business or size), since these data may also constitute fee-determining transaction attributes.

Once the transaction classification is complete, the transaction classification module 214 passes a transaction record number to the identification module 216. Upon receipt of the record identifier, the identification module 216 uses the current transaction attributes to query the fee database 222 and determine the fixed and percentage fee charged by each available payment processor 102; the identification module 216 thereby identifies the payment processor 102 with the lowest fee. The identification module 216 then transmits, via the communication module 210, the authorization request to the identified processor 102 and awaits approval or denial of the transaction before communicating the result to the merchant system 112.

In some embodiments, the bundling module 218 analyzes the current transaction attributes to determine if additional savings may be obtained by suspending processing of the current transaction pending receipt of additional transactions for the same consumer that may be bundled into one request. In various embodiments, the bundling module 218 may additionally evaluate the risk of authorizing the transaction without actually requesting, via a payment processor 102, confirmation from the consumer's issuing bank that the consumer has access to sufficient funds for the transaction. If an acceptable risk is determined the bundling module 218 communicates authorization to the merchant system 112, and marks the transaction as suspended in the transaction database 220.

Figure 3:
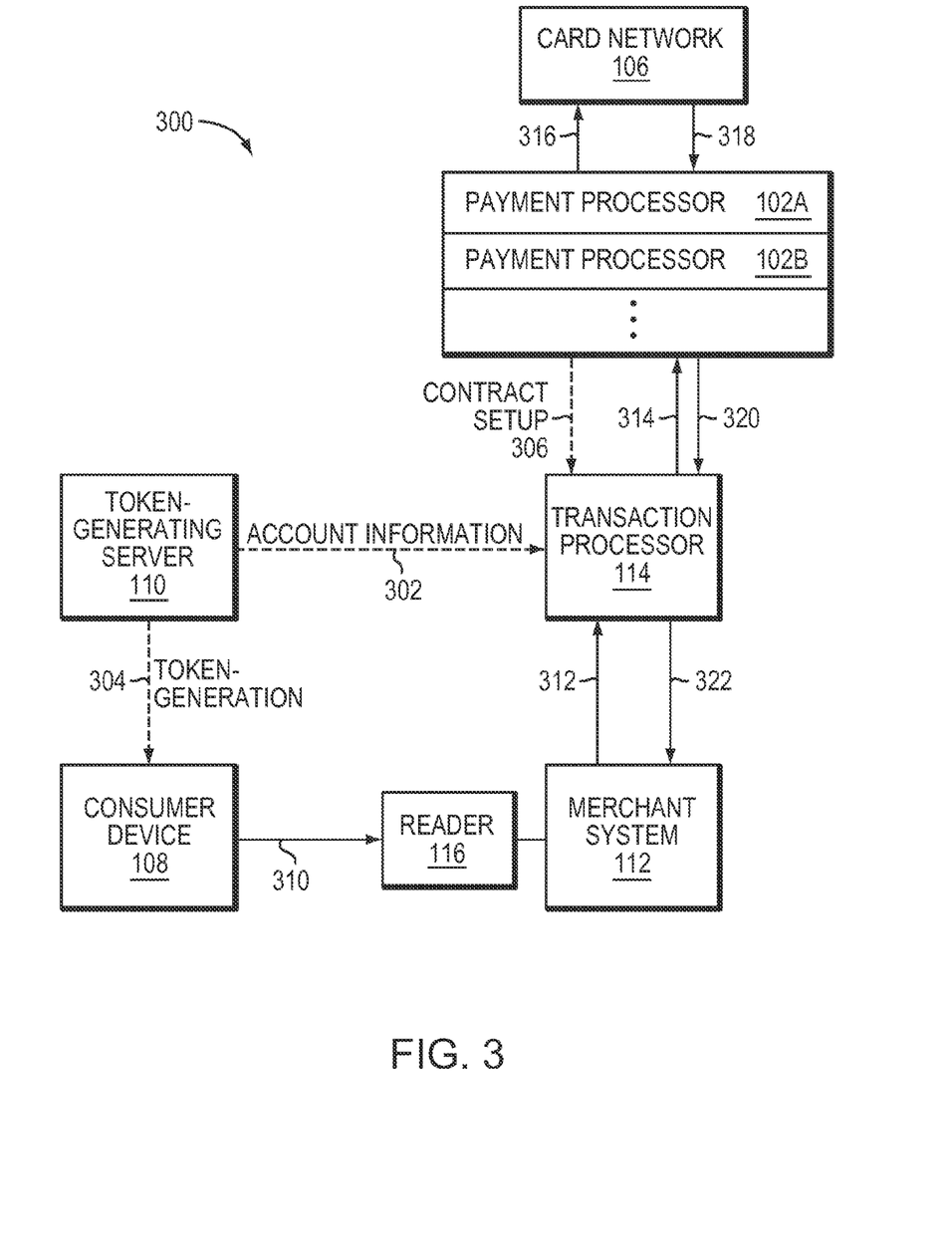
FIG. 3 conceptually illustrates a mobile payment transaction from initiation to completion in accordance with an embodiment of the invention.

FIG. 3 illustrates a representative data flow among the entities shown in FIG. 1 to execute a mobile payment transaction from initiation to completion. As indicated by broken lines, certain preliminary or support stages are prerequisite to the main process flow; these support stages need not take place in tandem or at specific times, but instead may occur whenever a network connection can be established. Solid lines illustrate the consecutive steps for payment authorization that presume prior completion of configuration stages. The configuration stages comprise an "update account information" stage 302, a token-generation stage 304, and an "add new payment processor" stage 306. The various stages and transaction processing steps will now be described in greater detail.

The update account information stage 302 may take place at any time when a network connection can be established. The token-generating server 110 may communicate with the transaction processor 114 each time a consumer or merchant account is modified, added or deleted to provide the updated information. Alternatively, the token-generating server 110 may periodically provide the transaction processor 114 with any changes that occurred since the last the update. New consumers and/or new merchants may register with the token-generating server 110 at any time to create an account that enables them to participate in payment transactions with a payment token, generated by the server 110, used as the payment method. When the consumer registers an account with the token-generating server 110, he is prompted to link to his account with server 110 at least one financial account to which a purchase made using an issued payment token will ultimately be charged. In one embodiment, the consumer may link more than one account and specify parameters dictating when each account is to be used (e.g., "use account X for transactions under $100"). The token-generating server 110 may prompt the consumer for additional information about the financial account. For example, if the consumer is registering a credit card she may be prompted to indicate if the card is a rewards card and, if so, what type. The consumer identifier and the associated financial account(s) and attributes are made available to transaction processor 114. A merchant, or merchant system 112, wishing to accept payment tokens issued by the token-generating server 110, also registers with the token-generating server 110. Upon successful registration, the merchant is assigned a unique identifier by the token-generating server 110 and this identifier is communicated to the transaction processor 114. Additionally, during the registration process, the merchant may be prompted to provide additional classification information such as, a size and/or industry category (e.g., retail) which, in turn, is also communicated to the transaction processor 114.

The token-generation stage 304 may take place at any time after a consumer registers an account and the token may be delivered to the mobile device 108 whenever a network connection can be established. Additionally, generation and delivery of the token may occur as two separate steps that may not occur simultaneously. The consumer, or an application acting on behalf of the consumer, may log in to the token-generating server 110 to retrieve a payment token. The token-generating server 110 thereupon generates a token that contains data identifying the consumer and/or the token and facilitating payment. For example, the token may contain actual financial account information or may instead contain information (such as an email address, telephone number, or random unique data) that can be mapped to the consumer's financial account by the transaction processor 114. In one embodiment, before being sent, the token is encrypted using, for example, a private key. The encrypted token is then transmitted to the mobile device 108 and the decryption key made available to the merchant system 112 and/or the transaction processor 114.

In the add payment processor stage 306, a contract with agreed-upon processing rates for payment transactions may be entered into by the transaction aggregator at any time to add a new payment processor to the plurality of payment processors 102 available. The agreed-upon pricing model is provided by payment processor 102 and is be uploaded to the fee database 222 (see FIG. 2). As previously described, each available payment processor 102 may have different transactional fee schedules. These fees and the parameters that determine them are set forth in the agreement between the payment processor and the transaction aggregator; these parameters may include, for example, the transaction amount, type of card used, merchant type, purchase type, a date/time of submission of the transaction, and other transactional parameters used in the industry. For example, the agreed-upon rates provided by a first payment processor 102A may be relatively inexpensive for DISCOVER CARD transactions under $5 but relatively expensive for VISA transactions at a foodservice merchant, whereas the rates charged by a second payment processor 102B may be the opposite.

A payment transaction may take place concurrently, following, or preceding any one of the stages described above. With reference to FIGS. 1 and 3, a payment transaction is initiated when the consumer presents a payment token (e.g., in the form of a QR code) stored in the mobile device 108 to the merchant system 112 (step 310). The merchant system 112 may scan the code using the reader 116, and transmits the token, along with information about the transaction (the amount to be paid, in particular) and the merchant's own identity, to the transaction processor 114, and awaits approval or denial (step 312). The transaction processor 114 analyzes the transaction details against the stored processing fees and the transaction attributes that determine them, and identifies the processor 102 with lowest rate for the transaction. The transaction processor 114 thereupon transmits the transaction details to the identified payment processor 102 (step 314). The payment processor 102, in turn, transmits the transaction details to the card network 106 corresponding to the consumer's financial account for confirmation that the consumer has sufficient funds available for the transaction (step 316). The transaction authorization moves through the card network 106 and the issuing bank confirms, or denies, the consumer's access to sufficient funds to complete the transaction, and transmits an authorization, or denial, to the payment processor 102 (step 318). The payment processor 102 transmits this response to the transaction processor 114 (step 320), which in turn communicates the response to the merchant system 112 (step 322).

The transaction processor 114 may be configured to reduce the per-dollar processing fee incurred by bundling multiple transactions across multiple merchants for a single consumer (and, typically, financial account or institution). The transaction processor 114 authorizes each transaction as it occurs (step 322) but suspends processing through the card network 106 until it can send the payment processor 102 a single request for payment representing the aggregate of several transactions (step 316). Additionally, the transaction processor 114 may evaluate the financial risk of the consumer before accepting the risk of authorizing a transaction without having first received verification from the issuing bank that the consumer has sufficient funds for the transaction, and only bundle transactions for the consumer if an acceptable risk level is determined. This risk level may be determined with reference to the consumer's credit history with the transaction aggregator (a denial-to-approval ratio for the completed transactions stored in the transaction database 220 associated with the consumer), a more generic credit history made available to the transaction processor 114 for analysis, or any other method of scoring credit risk known to those skilled in the art. The acceptable risk level (e.g., minimum credit score) may be set by the transaction aggregator. Typically the transaction aggregator receives a single payment for a set of bundled transactions, and distributes the money to the different merchants.

Figure 4:
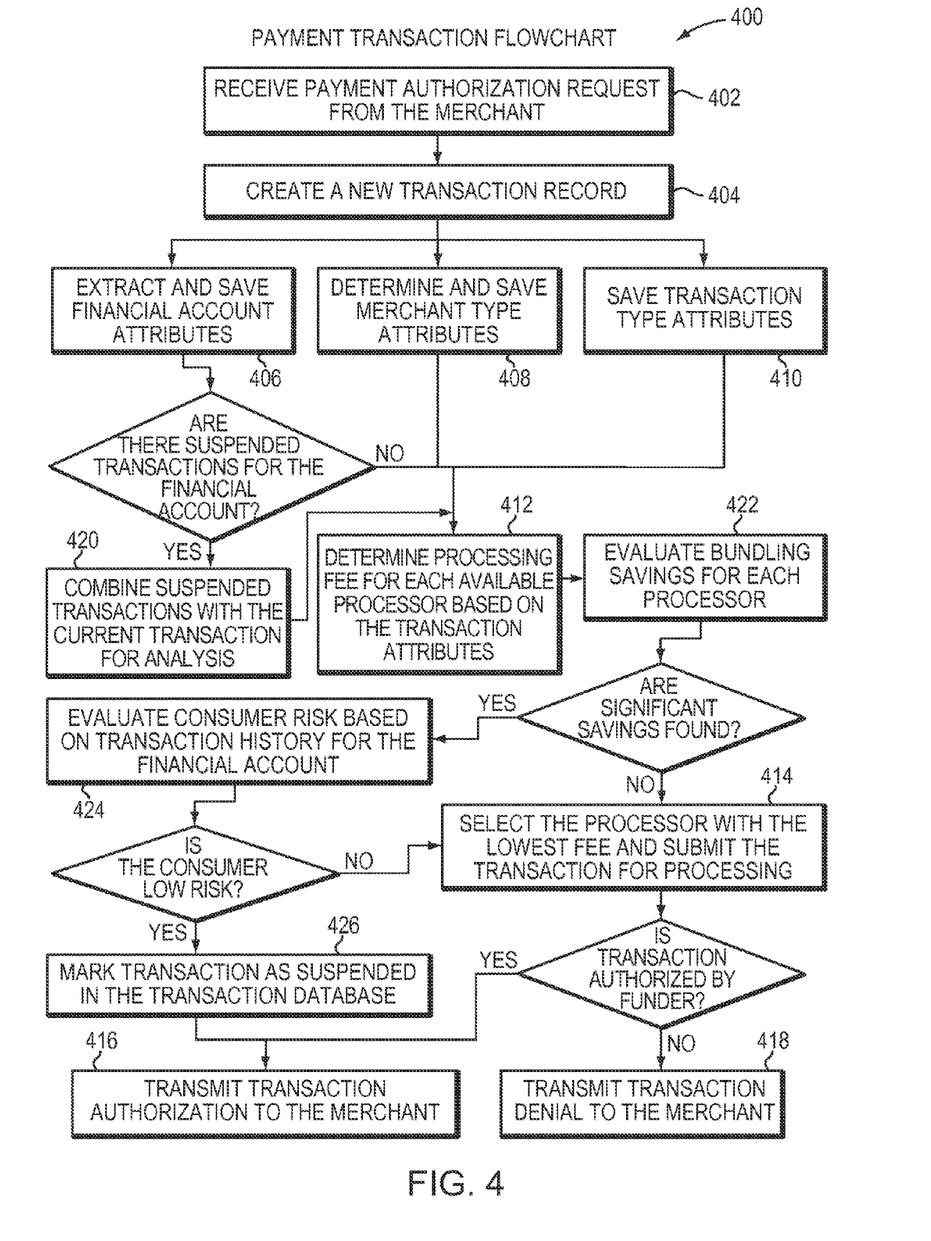
FIG. 4 is a flowchart illustrating identification of a payment processor charging the lowest fee to complete a payment transaction within a card network in accordance with an embodiment of the invention.

A representative method 400 for identifying the payment processor with the lowest fee to complete the transition in accordance with embodiments of the current invention is shown in FIG. 4 (with additional reference to FIGS. 1 and 2). A payment transaction is initiated when the consumer presents a payment token (e.g., in the form of a QR code) stored in the mobile device 108 to the merchant system 112. The merchant system 112 may scan the code using the reader 116 and thereupon transmits the token (along with information about the transaction and the merchant's own identity) to the transaction processor 114, and awaits approval or denial.

Upon receipt of the authorization request (step 402), the transaction classification module 214 creates a new record in the transaction database 220 (step 404) and parses the data received from the merchant system's transmission to extract transaction-attribute data. This data is used to query the fee database 222. In particular, the transaction classification module 214 decodes the token and analyzes the information contained therein—e.g., actual financial account information or information (such as an email address, telephone number, or random unique data) that can be mapped to the consumer's financial account. The transaction classification module 214 may query the consumer account database 224 to obtain the consumer ID and/or the relevant financial account and, in some embodiments, the stored financial account attributes. Additionally, the transaction classification module 214 may analyze the financial account number to identify the type of card being used (e.g., credit or debit), the card association (e.g., MASTERCARD, VISA, DISCOVER, etc.,), and other financial attributes, and saves this information to the current transaction record in the transaction database 220 (step 406). In some embodiments, transaction classification module 214 is further configured to computationally determine additional information from the account number pursuant to the ISO/IEC 7812 numbering standards, once again saving the extracted financial account attributes to the transaction record.

The transaction classification module 214 then analyzes the merchant identifier transmitted with the authorization, which corresponds to merchant's account number within the merchant database 226. The transaction classification module 214 queries the merchant database 226 for the merchant identifier and extracts the relevant merchant type attributes (e.g., business size, type of business, credit history, or the like). Additionally, the transaction classification module 214 may assign a credit risk score to the merchant as one of the attributes likely to affect the transaction fee. In general, an interchange fee (passed along in the payment processor's fee) is higher for merchant categories associated with a high likelihood of returns (e.g., retail) and lower for merchant categories with a low likelihood of returns (e.g., food service). The credit risk value may be numeric or may simply be a coarse level, e.g., low, medium, or high. The transaction classification module 214 saves the extracted and/or calculated merchant attributes to the transaction record (step 408).

The parsed information may also include details of the actual transaction, such as the total amount, date/time, type of purchase, or any other transactional information provided by the merchant system 112. The data is saved to the record for the current transaction (step 410) and the transaction classification module sends the transaction record number to the identification module 216 to signal that module should now identify a payment processor with the lowest rate to process the transaction.

In one embodiment, the transaction processor 114 is configured to process single transactions in an effort to avoid the risk associated with authorizing transactions that have not been already authorized by a consumer's issuing bank. As previously described, each available payment processor 102 charges for services rendered and charges varying fees for each transaction, and the fees differ among processors based on transaction attributes. Accordingly, the identification module 216 queries the fee database 222 based on the compiled transaction attributes to determine the fee that each payment processor will charge for the current transaction (step 412). In the event that a fee for the current transaction is not identifiable for an available payment processor 102 based on the current transaction attributes, the identification module 216 may exclude that processor from the selection process, or it may use the highest fee or an average of the fees recorded for that payment processor when comparing the fees across processors. The identification module 216 then identifies the payment processor with the lowest determined fee for the current transaction and selects this processor to receive the transaction details and move the transaction through credit card network 106 (step 414). Upon receipt of authorization or denial of the transaction from issuing bank, communicated via to the payment processor 102, the transaction processor 114 in turn communicates the authorization (step 416) or denial (step 418) of the transaction to the merchant system 112.

Alternatively, the identification module 216 may take a calculated risk by selecting a payment processor with an unknown fee based on one or more of the transaction attributes. For example, it may be known that payment processor 102A charges a fixed fee of $0.05 per transaction and a percentage fee of either 1.5% or 2% on VISA debit card purchases but it is unknown which merchant types qualify for the lower rate of 1.5%. However, if the current transaction is a VISA debit card purchase at a restaurant, which is considered a low credit risk merchant type, then the identification module 216 may assume the lower rate will be charged. Additionally, the identification module 216 may record an identifier for the selected payment processor 102 in the transaction record for subsequent fee analysis by the fee classification module 212. In this way, selecting processors with an unknown fee may ultimately result in greater savings as more information about the transaction classification methods of a given payment processor become available or are inferred through analysis of the processing fees charged for a specification transaction.

In one embodiment, the transaction processor 114 is provisioned with a bundling module 218 that analyzes the current transaction attributes to determine if additional savings may be obtained by suspending processing of the transaction until multiple transactions charged to the same financial account, which may be bundled into a single request, are received. Grouping transactions together saves on, for example, the fixed fee that a processor charges but the savings may also be based on the dollar volume, card type, or merchant mix. The bundling module 218 may first extract the financial account inform from the current transaction record upon its classification by the transaction classification module 214. The bundling module then searches the transaction database 220 for any suspended records with the same financial account as is associated with the current transaction. If one or more suspended records are found with the same financial account, the bundling module combines the transaction attributes for the current and suspended transaction(s) (step 420) and saves a temporary record for the identification module 216 to evaluate as one transaction. The identification module 216 then determines the processing fee for each available payment processor 102 based on the combined transaction attributes (step 412). The bundling module 218 uses these determined fees to evaluate if significant saving can be obtained by bundling the current transaction, or transactions, with anticipated future transactions charged to the same financial account (step 422). The bundling module 218 may make some decisions based on certain break points. For example, the bundling module 216 may have identified three suspended transactions worth $99 and now finds that a given processor gives a lower fixed and/or variable fee on transactions above $98. The third transaction has now qualified the bundle for this savings, and the bundling module 218 transmits a single request for payment representing the aggregate of these three transactions. Alternatively, the bundled module 216 may identify a different processor that gives an even bigger price reduction for transactions above $100. Rather than closing the bundle on that transaction, the bundling module 218 may be willing to take on the extra risk to wait for a next transaction to get above $100, calculating that it that it will provide significant savings. In various embodiments, the bundling module 218 evaluates the risk of authorizing the transaction without requesting authorization from the consumer's issuing bank by determining the consumer's financial risk (step 424) as described above. If an acceptable risk is determined, the bundling module 218 marks the transaction as suspended in the transaction database 220 (step 426) and communicates authorization to the merchant system 112 (step 416). Conversely, if an unacceptable risk is found, transaction processing is passed backed to the identification module 216 for processing as a single transaction as described above. In addition, or alternatively, suspension of transaction processing may be limited by the amount of time a merchant is willing to wait and the bundling module 218 may enforce a maximum delay, or expiration time of suspension, for processing of a suspended transaction. The determined delay period may be merchant-specific or a global maximum delay of, for example 2 days, may be applied to suspended transactions. If additional authorization requests qualifying for the bundle are not received upon expiration of the predetermined delay period, transaction processing is passed backed to the identification module 216 for processing as a series of single transactions as described above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, each of the processors described herein may be a general-purpose computer, but alternatively may be a CSIC (consumer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The various modules and apps described herein can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computer-implemented method of conducting a payment transaction between a merchant and a consumer, the method comprising:
   receiving and storing payment-processing fee rates from a plurality of payment processors available to process the transaction, the fee rates being classified by at least one transaction attribute;
   receiving, by a payment server from a merchant system, a payment-transaction authorization request for a purchase by the consumer;
   determining, based on computational analysis of the authorization request, at least one transaction attribute for the payment transaction;
   identifying, from the plurality of payment processors, a payment processor with a lowest fee based at least in part on the at least one determined transaction attribute; and
   transmitting the authorization request to the identified payment processor to complete the payment transaction.

2. The method of claim 1, wherein the authorization request comprises a payment token, a transaction amount, and a merchant identifier.

3. The method of 2, wherein the payment token is encoded with data identifying a financial account.

4. The method of claim 1, wherein the at least one transaction attribute comprises a type of payment card presented by the consumer.

5. The method of claim 1, wherein the at least one transaction attribute comprises a merchant type.

6. The method of claim 1, wherein the at least one transaction attribute comprises a purchase type.

7. The method of claim 1, wherein the at least one transaction attribute comprises a time of transmission of the authorization request.

8. The method of claim 1, wherein the at least one transaction attribute comprises an aggregate value of unprocessed transactions of a consumer involving a single financial institution.

9. The method of claim 1, further comprising:
   prior to transmitting the authorization request to the identified payment processor, computationally determining a transaction bundling savings for each of the plurality of processors based on the at least one transaction attribute; and
   if the determined savings is above a predetermined amount, suspending processing of the authorization request until the earlier of (i) expiration of a predetermined delay period or (ii) receipt of additional authorization that when bundled qualify for the determined savings.

10. The method of claim 9, further comprising determining a financial risk level for the consumer by analyzing a stored transaction history and suspending processing only if the risk level is determined to be acceptable.

11. The method of 1, further comprising:
   analyzing the processing fees charged by the identified payment processor upon transaction completion; and
   updating the stored fee rates for the identified processor based on the charged fees.

12. A system for conducting a payment transaction between a merchant and a consumer, the system comprising:
   a fee database for storing payment-processing fee rates from a plurality of payment processors available to process the transaction, the fee rates being classified by at least one transaction attribute;
   a processor for executing:
      a transaction classification module for (i) receiving, from a merchant system, a payment transaction authorization request and (ii) computationally analyzing the authorization request to determine at least one payment attribute for the payment transaction;
      an identification module for identifying, from the plurality of payment processors, a payment processor with a lowest fee based on the at least one determined transaction attribute; and
      a communication module for causing transmission of the authorization request to the identified payment processor to complete the payment transaction.

13. The system of claim 12, wherein the authorization request comprises a payment token, a transaction amount, and a merchant identifier.

14. The system of claim 13, wherein the wherein the payment token is encoded with data identifying a financial account.

15. The system of claim 12, wherein the at least one transaction attribute comprises a type of payment card presented by the consumer.

16. The system of claim 12, wherein the at least one transaction attribute comprises a merchant type.

17. The system of claim 12, wherein the at least one transaction attribute comprises a purchase type.

18. The system of claim 12, wherein the at least one transaction attribute comprises time of transmission of the authorization request.

19. The system of claim 12, wherein the at least one transaction attribute comprises an aggregate value of unprocessed transactions of a consumer involving a single financial institution.

20. The system of claim 12, further comprising:
   a transaction database for storing records of suspended and completed transactions;

a bundling module for (i) computationally determining a transaction bundling savings for each of the plurality of processors based on the at least one transaction attribute and (ii) if the determined savings is above a predetermined amount, suspending processing of the authorization request and storing the suspended transaction in the transaction database.

21. The system of claim 20, wherein the bundling module is configured to maintain suspension of the transaction until the earlier of (i) expiration of a predetermined delay period or (ii) receipt of additional authorization requests that when bundled qualify for the determined savings.

22. The system of claim 20 wherein the bundling module is configured to determine a financial risk level for the consumer by analyzing a stored transaction history and to suspend processing only if the risk level is determined to be acceptable.

* * * * *